Dec. 10, 1940.  V. T. WIGLESWORTH  2,224,176
DIRECTION INDICATING MECHANISM
Filed Aug. 12, 1936
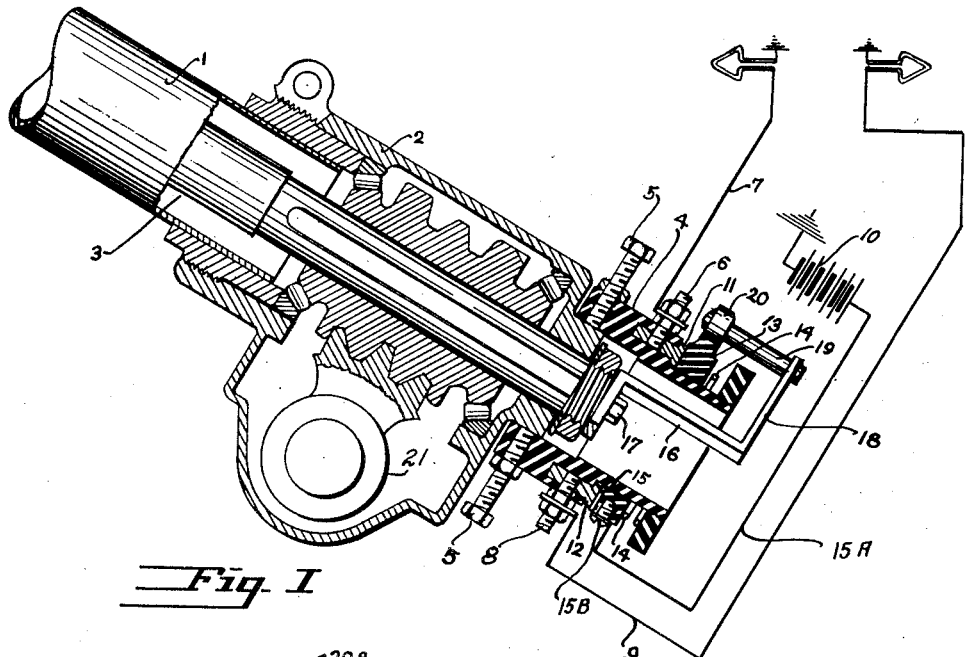
Fig. I
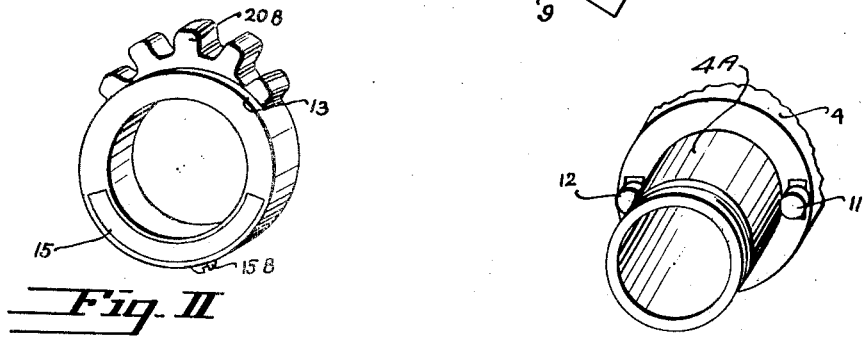
Fig. II
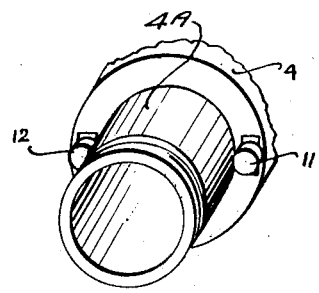
Fig. III
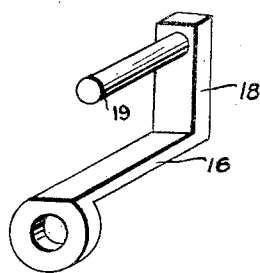
Fig. IV
Inventor
Victor T. Wiglesworth
By Thomas Bellyer
Attorney Patented Dec. 10, 1940

2,224,176

UNITED STATES PATENT OFFICE 2,224,176

DIRECTION INDICATING MECHANISM

Victor T. Wiglesworth, Portland, Oreg., assignor of one-half to Alexander Sweek, Portland, Oreg.

Application August 12, 1936, Serial No. 95,604

3 Claims. (Cl. 200—59)

My invention relates to improvements in electric switch actuating devices for operating the direction indicating signal of automobiles and motor vehicles of all kinds.

One of the objects of my invention is to provide an improved device which is controlled by movements of the steering post of the vehicle to operate a signal or signals to indicate the direction the vehicle is to be turned.

The invention is comprised of a housing support that is adapted for being fixedly and centrally mounted upon the lower end of the steering column of the housing and on which is mounted a ring carrying electric terminals. A gear segment is mounted upon the ring and a stub shaft is adapted for coacting with the gear segment and is mounted upon a bracket support adapted for being secured to the steering stem of the vehicle.

The primary purpose and object of my invention is to provide a simply constructed device through the operation of which the direction that the vehicle is to be turned will be indicated as the steering column is moved to steer the vehicle.

A further object of my invention is to so construct the switching device that the wear on the parts will be normal in repeated use, one that may be easily removed from the vehicle for repair and one that will have a long and useful life with practical freedom from operating annoyances.

With these and incidental objects in view, the invention consists in certain novel features of construction of parts, the essential elements of which are set forth in the appended claims, and a preferred form of embodiment of which is hereinafter shown with reference to the drawing which accompanies and forms a part of this specification.

Fig. 1 is a sectional side view of the assembled device shown supported upon the housing at the lower end of the steering column or steering part of the vehicle.

Fig. 2 is a perspective end view of the gear segment ring that carries a contact plate.

Fig. 3 is a perspective end view of the housing support that is adapted for being secured to the housing and at the lower end of the steering column.

Fig. 4 is a perspective end view of the bracket securable to the lower end of the steering stem and the stub shaft that is secured thereto for coacting with the gear segment and for driving the same.

Like reference characters refer to like parts throughout the several views.

1 is the sleeve of the steering column. A housing 2 is indirectly secured to the lower end of the sleeve and the steering stem 3 passes through the column and through the housing.

I secure an insulated mounting 4 to the lower end of the housing 2 and in order that the same may be secured thereto and arranged coaxially therewith I provide a plurality of set screws 5 to axially align the insulated mounting with that of the steering stem and column. An electric terminal 6 is secured to the insulated mounting and an electric conductor 7 is secured thereto and leads therefrom. A second electric terminal 8 is secured to the insulated mounting and an electric conductor 9 is secured to the electric terminal and leads therefrom. Electric contact points 11 and 12 are imbedded within the insulated mounting and are in direct communication with the electric terminals 6 and 8.

A ring 13 is mounted upon the insulated mounting and is rotatable relative thereto. The one of the end faces of the ring 13 is in normal contact with and in engagement with the contact points 11 and 12. The ring 13 is maintained in intimate contact with the contact points 11 and 12 by any reactance means as through the use of coil springs 14 which urge the face of the ring 13 into engagement with the contact points 11 and 12.

A contact plate 15 is imbedded within the face of the ring 13 so that the outer surface of the plate 15 and the adjacent face of the ring 13 are in surface alignment. Contact is effected between the plate 15 and the electric conductor 15A through the use of a set screw 15B. A bracket 16 is secured to the lower end of the stem 3 by any suitable fastening means as through the use of a set screw 17. The bracket 16 has an outwardly extending arm 18 and a stub shaft 19 is secured to the outer end of the arm 18. The stub shaft 19 is fashioned so as to coact with the gear segment 20B that is formed upon the outer surface of the ring 13 and when the stub shaft 19 engages one of the teeth of the gear segment 20B the ring will be rotated so long as the member 19 is in contact with one of the teeth. It will be noted that the center of the gear segment is off center relative to the center of the ring 13. The frictional engagement between the face of the ring 13 and the contact points 11 and 12 caused by the springs 14 prevents the over-rotation of the ring 13 and permits the stub shaft 19 to pick up one of the teeth when the stem 3 is rotated in the reverse direction.

This device is particularly adaptable for use upon vehicles in which the rotary movement imparted to the steering wheel to accomplish proper turning movements of the vehicle front steering wheels is less than 360 degrees. While the applicant has here shown but five teeth upon the ring 13, it is submitted that a larger number may be used and applicant does not wish to be limited to the number of teeth shown.

The pin 19 carried by the bracket at the end of the steering column may be selectively positioned between a chosen pair of teeth so that the signaling device could be rendered operable in one direction of turning movement in advance of operation thereof in the other direction of turning movement. The pin 19 may always be made to engage with the gear 13 so that the direction indicating mechanism may always be operated during rotary movement of the steering post.

As the stem is rotated by the steering wheel of the vehicle the arm 18 will also be rotated and in doing so the stub shaft 19 coacts with the gear segment 21 and rotates it so that the contact plate 15 completes the circuit through one of the conducting circuits.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, in combination with a steering column and housing, comprising an insulating mounting, means for attaching the mounting coaxially with that of the steering column, a plurality of electric terminals mounted relative to the insulating mounting, electric contact points associated with the terminals and with the insulating mounting, a ring carrying an arcuate electric contact plate, a gear segment carried by the ring, reactance means for urging the ring into engagement with the contact points, a bracket secured to the stem of the steering column and outwardly extending therefrom, a stub shaft rotatably mounted relative to the bracket and adapted for coacting with the gear segment and adapted for rotating the gear segment as the stem of the steering column is rotated and for energizing one electric circuit when the stem is rotated in one direction and for energizing another electric circuit when the stem is rotated in the opposite direction.

2. In a device of the class described, the combination with a steering post and sleeve of a steering mechanism, of an insulating mounting removably secured to the housing of the steering column, electric terminals and electric contact points associated with the insulating mounting, a ring rotatably mounted upon the insulating mounting, said ring carrying a gear segment and an electric contact plate with said plate being normally out of engagement with the electric terminals, reactance means for maintaining the ring in engagement with the electric contact points, a stub shaft coacting with the gear segment and means for rotating the stub shaft as the stem of the steering column is rotated.

3. In a device of the class described, the combination with the steering post and sleeve of a steering column comprising an insulating mounting, means for removably aligning the mounting and securing the same to the housing of the steering column, electric terminals and electric contact points carried by the housing, a ring mounting, an electric contact plate, and means through a coacting gear segment and a stub shaft for rotating the ring as the steering column is rotated and for energizing independent electric circuits predetermined by the direction of rotation of the steering column of the vehicle.

VICTOR T. WIGLESWORTH.